United States Patent [19]

Ogura

[11] 4,326,781
[45] Apr. 27, 1982

[54] FILM SAG DETECTING DEVICE FOR SOUND CINECAMERA

[75] Inventor: Wataru Ogura, Suwa, Japan

[73] Assignee: Chinon Industries Incorporation, Suwa, Japan

[21] Appl. No.: 889,264

[22] Filed: Mar. 23, 1978

[30] Foreign Application Priority Data

Apr. 8, 1977 [JP] Japan .......................... 52/44516[U]

[51] Int. Cl.³ ............................................ G03B 31/00
[52] U.S. Cl. ...................................................... 352/14
[58] Field of Search ........................................... 352/14

[56] References Cited

U.S. PATENT DOCUMENTS

| | | | |
|---|---|---|---|
| 3,597,056 | 8/1971 | Sasaki | 352/14 |
| 3,848,977 | 11/1974 | Scholz | 352/14 |
| 3,901,590 | 8/1975 | Ashida et al. | 352/14 |

Primary Examiner—Monroe H. Hayes
Attorney, Agent, or Firm—Blanchard, Flynn, Thiel, Boutell & Tanis

[57] ABSTRACT

This film sag detecting device for a sound cinecamera is provided with an opto-electronic coupler located along a film path which is formed between a means for intermittent feeding of a film for exposure and a means for continuous feeding of the same for recording sounds thereon. The opto-electronic coupler comprises a light emitting element and a light receiving element and it is placed to allow the film to interrupt a light path which bridges the two light elements exclusively when the film excessively sags, so as to detect any excessive sag of the film.

2 Claims, 4 Drawing Figures

FILM SAG DETECTING DEVICE FOR SOUND CINECAMERA

BACKGROUND OF THE INVENTION

The present invention relates to a film sag detecting device for a sound cinecamera.

Referring to FIG. 1 showing a typical film sag detecting device in accordance with the prior art, the sound cinecamera is provided with a motor 2 and a film advancing tool 3 for intermittent feeding of a film for exposure, a motor 5, a capstan 6 and a pinch roller 7 for continuous feeding of the film for recording sounds on it by means of a sound recording head 4 and a film sag detecting device including a detecting lever 8. The aforementioned means, in combination, performs a function of maintaining the film sag at an appropriate amount in the film path formed between the film advancing tool 3 and the capstan 6 so as to achieve the desired smooth junctioning of both the film advancing tool 3 and the capstan 6.

The aforementioned film sag detecting device in accordance with the prior art consists of the detecting lever 8 attached with a film sag detecting element on one end thereof and also rotatably supported by a supporting pin 10, a tension spring 9 applied to detecting lever 8, an arm branching from the detecting lever 8 and forming a blind 11 on one end thereof, and a light emitting diode 12 and a photo transistor 13 respectively placed on either side of the blind 11 within the operation area thereof.

Supposing an excessive sag occurs in the film path between the film advancing tool 3 and the capstan 6, the excessively sagging film 1 pushes the detecting lever 8 down to cause a clockwise rotation of said lever around the pin 10 against the tension spring 9. This action moves the arm branching from the detecting lever 8 to cause the blind 11 formed on one end thereof to interrupt the light path bridging the light emitting diode 12 and the photo transistor 13. As a result, the light beam received by the photo transistor 13 is interrupted to cause the electric circuits including the photo transistor 13 and the motor 2 to reduce the film feeding rate of the film advancing tool 3, thereby correcting the excessive sag of the film 1.

As mentioned above, the utilization of the photoelectric means is rather limited, and the film sag detecting device of the prior art predominantly relies on mechanical means, such as the detecting lever 8 for direct detection of excessive film sag. This causes various faults including a considerable possibility of frequent occurrence of mechanical failure and the inherent requirement for a rather large space in the camera body. Another fault to be recognized in the prior art is the inconvenience incurred when loading a camera with a film cartridge caused by the necessity to keep pushing the detecting lever 8 downwardly during the film loading operation, because the customary setup of a camera requires that it be loaded with a film cartridge from the front or downward from the front side to the back side of the page in FIG. 1.

SUMMARY OF THE INVENTION

A general object of the present invention is to provide a film sag detecting device for a sound cinecamera which is free from the aforementioned various faults recognized in the models in accordance with the prior art.

Another object of the present invention is to provide a film sag detecting device for a sound cinecamera which is provided with an opto electronic coupler located along a film path formed between a means for intermittent feeding of a film for exposure and a means for continuous feeding of the film for recording sounds on it, which opto-electronic coupler comprises a light emitting element and a light receiving element and is placed to allow the film to interrupt a light path bridging the two light elements exclusively when the film excessively sags, whereby a limited use of the mechanical means causes a lesser opportunity of the occurrence of mechanical failure and a lesser requirement for space in the camera body.

A further object of the present invention is to provide a film sag detecting device for a sound cinecamera provided with an opto-electronic coupler placed inside an L-shaped frame, in which the vertical part of the frame is fitted along the internal back surface of the camera body and in which the horizontal part of the frame extends from the internal back surface of the camera body toward the front portion of the camera body to allow the film to stay within an open space which is formed in front of the vertical part of the L-shaped frame and above the horizontal part of the L-shaped frame in a free position or without being disturbed by any other member comprising the camera, whereby it is extremely easy to load the camera with a film cartridge.

An additional object of the present invention is to provide a film sag detecting device for a sound cinecamera provided with an opto-electronic coupler comprising a light emitting element placed in either the vertical part of the L-shaped frame or the horizontal part of the L-shaped frame and a light receiving element placed in the other part of the frame and forming a light path inclined to the potential film surface, which film surface stays, under normal sag, at a relatively higher position and which film surface assumes a relatively lower position when the film sag exceeds a normal limit, whereby the asccuracy for detecting the film sag is extremely improved.

A further additional object of the present invention is to provide a film sag detecting device for a sound cinecamera provided with an opto-electronic coupler placed inside an L-shaped frame which is adjustably fitted along the internal back surface of the camera body to allow adjustment of the vertical position and inclination of the L-shaped frame in relation to the potential normal film surface and resultantly of the vertical position and inclination of the light path in relation to the potential normal film surface, whereby it is possible to adjust the accuracy or the minimum extent for detecting the film sag.

DETAILED DESCRIPTION OF THE INVENTION

The following description concerns the portions which are novel or different and distinctive from the corresponding portions of models in accordance with the prior art. The same reference numbers are given to the same portions, parts or members throughout the description for both the prior art and the present invention.

Figure 2:
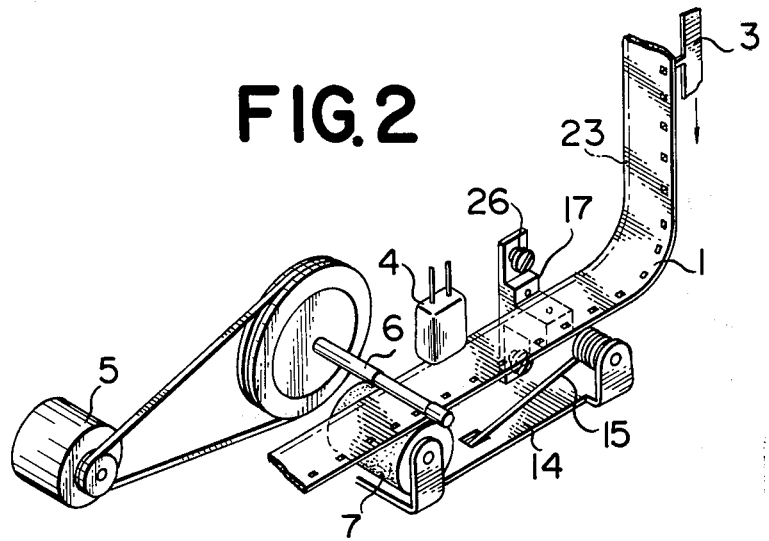
FIG. 2 is a perspective view of a portion of a sound cinecamera provided with an embodiment of the film sag detecting device in accordance with the present invention.
Figure 3:
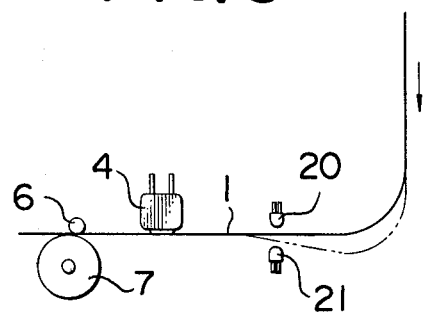
FIG. 3 is a schematic view of a portion of FIG. 2.
Figure 4:
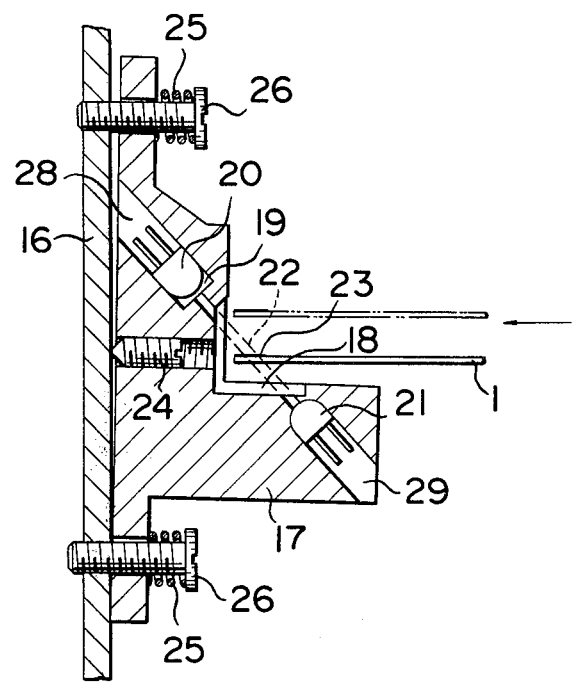
FIG. 4 is an enlarged sectional view of an embodiment of film sag detecting device in accordance with the present invention shown in FIG. 2.

FIG. 2 through 4 show an embodiment of the present invention.

Figure 1:
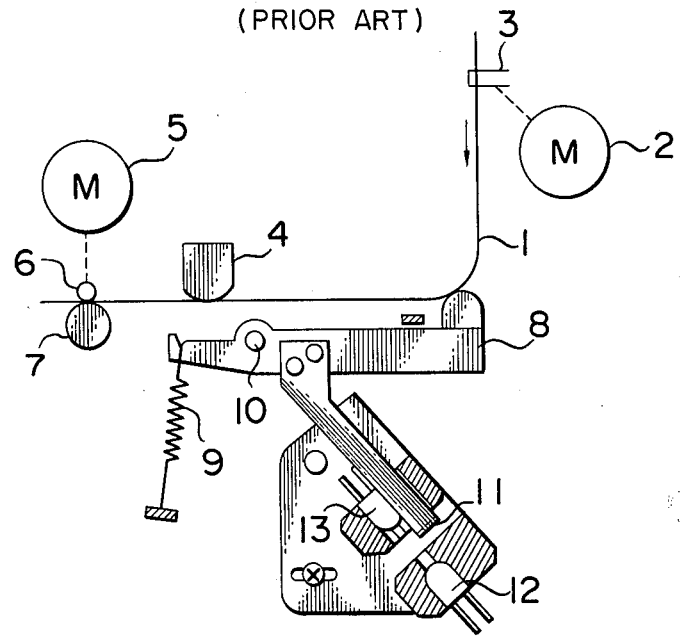
FIG. 1 is a schematic drawing showing principally the film sag detecting portion of a typical sound cinecamera, in accordance with the prior art.

Referring to FIG. 2, a bracket 14 supports a pinch roller 7 and a spring 15 urges the bracket 14 to press the pinch roller 7 against a capstan 6 which extends across a film 1. Both of these are known in the prior art, though they are not shown in FIG. 1.

Indicated as 17 is a film sag detecting device in accordance with the present invention, more specifically the frame of the film sag detecting device. The film sag detecting device 17 is placed ahead of a sound recording head 4 in the film path between the film advancing tool 3 and the capstan 6. The frame 17 of the film sag detecting device is formed of an L-shaped member consisting of a vertical part fitted along a supporting member 16 (FIG. 4) which is further fitted along the internal back surface of a camera body. The frame 17 includes a horizontal part extending from the internal back surface of the camera body toward the front portion of the camera body. The frame 17 is fitted along the supporting member 16 in such a manner that the vertical part of the L-shaped member is placed at the back of the film path, leaving an open space for the film to pass through and that the horizontal part of the L-shaped member extends toward the front portion of the camera body also leaving an open space, above the horizontal part of the L-shaped member, for the film to pass through. Accordingly, it is extremely easy to load the camera with a film 1.

Referring to FIG. 4, the frame 17 has two openings 28 and 29, respectively, on the vertical part and the horizontal part. A light emitting element 20, specifically a red visible ray emitting element, is placed in the opening 28 together with a condensing lens 19. A light receiving element 21, specifically a silicon photo transistor, is placed in the opening 29. These light elements form an opto-electronic coupler. The light emitting element 20 and the photo transistor 21 are placed to face each other, forming between them a light path 22 which is inclined relative to the surface of the film 1 at an angle of about 45 degrees. A transparent L-shaped plate 18 is placed across the internal corner of the frame 17 at which the vertical part and the horizontal part thereof join with each other in order to protect the elements 20 and 21 from being polluted by dust. Therefore, the aforementioned light path 22, starting at the light emitting element 20, passes through the vertical part of the transparent plate 18, the open space outside the frame 17 and the horizontal part of the transparent plate 18, before it arrives at the photo transistor 21. Since the film 1 stays at a relatively higher position above the horizontal part of the frame 17, as shown by the chain-dotted line in FIG. 4, when it has a normal amount of sag, it does not interrupt the light path. However, when the film 1 excessively sags, the film 1 occupies a relatively lower position above the horizontal part of the frame 17, as shown by the solid line in FIG. 4, and consequently, the magnetically coated stripe 23 formed on one edge of the film 1 interrupts the light path 22. The reason why one edge of the film 1 is magnetically coated to interrupt the light path 22 is to prevent the film 1 proper from being exposed to the light emitted from the light emitting element 20. If an infrared ray emitting element, rather than a red visible ray emitting element, is used, such danger could be effectively avoided. In this manner, it is possible to detect whether the film sag is in the normal and allowable state or in an excessive and abnormal state.

Also referring to FIG. 4, indicated as 24 is a screw penetrating the vertical part of the frame 17 around the center thereof. The screw 24 contacts the internal surface of the supporting member 16 at one end thereof and is adjustable for adjusting the position of the frame 17 back and forth. Screws 26 fit the frame 17 on the supporting member 16, and a compression spring 25 lies between the head of the screw 26 and the frame 17. Therefore, the relative adjustment of the screwing extent between the pair of screws 26, in combination with the adjustment of the length of the screw 24 extending from the frame 17, is effective to adjust the position and the inclination of the light path 22, resulting in an effective adjustment of the minimum extent and the full range of the film sag requiring detection.

When the film 1 excessively sags as shown by the chain-dotted line in FIG. 3, the film 1 approaches the horizontal part of the frame 17 as shown by the solid line 1 in FIG. 4, allowing the magnetically coated stripe 23 to interrupt the light path 22 of the opto-electronic coupler. This interruption of the light path 22 causes the pertinent electric circuits to function for reducing the film feeding rate by means of the film advancing tool 3 driven by the motor 2, resulting in the appropriate correction for an excessive sag of the film 1. When the sag of the film 1 is corrected to the normal extent, the film 1 returns to the relatively higher position above the horizontal part of the frame 17 as shown in the chain-dotted line in FIG. 4, resulting in termination of the interruption of the light path 22, causing the motor 2 to revert to the normal operation for allowing the film advancing tool 3 to maintain the normal film feeding rate.

Since the film sag detecting device of the present invention uses mechanical means to an extremely limited extent, the opportunity for the occurrence of mechanical failure, as well as the requirement for space in a camera body, are extremely reduced from the models in accordance with the prior art.

Although a particular preferred embodiment of the invention have been disclosed in detail for illustrative purpose, it will be recognized that variations or modifications of the above disclosed devices, including the arrangement of parts, lie within the scope of the present invention.

What is claimed is:

1. In a sound cinecamera comprising a sound cinecamera body defining a compartment for holding a film cartridge containing a movable film, said sound cinecamera body having an openable front portion so that the film cartridge can be loaded therein, intermittent film-feeding means for intermittently advancing said film for effecting exposure thereof and continuous film-feeding means for continuously advancing said film past sound recording means to record sound thereon, the sound cinecamera body providing an open film path between said intermittent film-feeding means and said continuous film-feeding means including a portion of said open film path wherein the film sags to a variable extent depending on the speeds of movement imparted to said film by said intermittent film-feeding means and said continuous film-feeding means, the improvement which comprises: a film sag detecting device comprising an opto-electronic coupler located adjacent said open film path and adjacent the back portion of the sound cinecamera body so as not to interfere with loading and unloading of a film cartridge into said body, said opto-electronic coupler defining a light path which is inclined relative to the film surface as the film moves through said portion of said open film path, said light path being positioned so that it is interrupted or not interrupted depending on the vertical position of said film surface as it moves through said portion of said open film path and interruption of said light path caused by excessive sagging of the film is effective to adjust the speed of film movement to eliminate the excessive sagging, said film sag detecting device further comprising an upright supporting member mounted on the back of said sound cinecamera body and a substantially L-shaped frame, said frame comprising a substantially horizontal leg and a substantially vertical leg, said vertical leg extending upwardly alongside said supporting member and being mounted thereon, said horizontal leg projecting from the lower end of said vertical leg toward the front portion of said sound cinecamera body and being disposed below said open film path, said opto-electronic coupler comprising a light emitting element and a light receiving element mounted on said frame with their optical axes in longitudinal alignment with each other to define said light path, one of said light emitting element and said light receiving element being mounted in said vertical leg and the other of said light emitting element and said light receiving element being mounted in said horizontal leg, the light path defined by the aligned optical axes of said light emitting element and said light receiving element extending outside the frame diagonally between said vertical leg and said horizontal leg substantially in the form of a hypotenuse of the right angle defined by the intersection of said vertical leg and said horizontal leg, whereby when the film is in the normal state free of excessive sag it is disposed above said light path and when the film sags excessively its edge intersects said light path, said light emitting element and said light receiving element being mounted in openings in said vertical and horizontal legs of said frame, said legs having aligned passageways extending from the inner ends of said openings toward each other, and a transparent L-shaped plate covering the internal corner of said L-shaped frame and covering the inner opposing ends of said passageways, whereby loading and unloading of the film cartridge can be effected easily and film sag is accurately detected by said opto-electronic coupler.

2. A film sag detecting device comprising: an upright supporting member; a substantially L-shaped frame comprising a substantially horizontal leg and a substantially vertical leg, said vertical leg extending upwardly alongside said supporting member and being mounted thereon, said horizontal leg projecting sidewardly from the lower end of said vertical leg and providing above the upper surface thereon an unobstructed zone through which film can travel; a light emitting element and a light receiving element mounted on said frame with their optical axes in longitudinal alignment with each other to define a light path which is inclined relative to the horizontal so that when film in said zone sags excessively the edge of said film intersects said light path, one of said light emitting element and said light receiving element being mounted in said vertical leg and the other of said light emitting element and said light receiving element being mounted in said horizontal leg, the light path defined by the aligned optical axes of said light emitting element and said light receiving element extending outside the frame diagonally between said vertical leg and said horizontal leg substantially in the form of a hypotenuse of the right angle defined by the intersection of said vertical leg and said horizontal leg, whereby when the film is in the normal state free of excessive sag it is disposed above said light path and when the film sags excessively its edge intersects said light path, said light emitting element and said light receiving element are mounted in openings in said vertical and horizontal legs of said frame, said legs having aligned passageways extending from the inner ends of said openings toward each other and a transparent L-shaped plate covering the internal corner of said L-shaped frame and covering the inner opposing ends of said passageways.

* * * * *